Patented Aug. 8, 1939

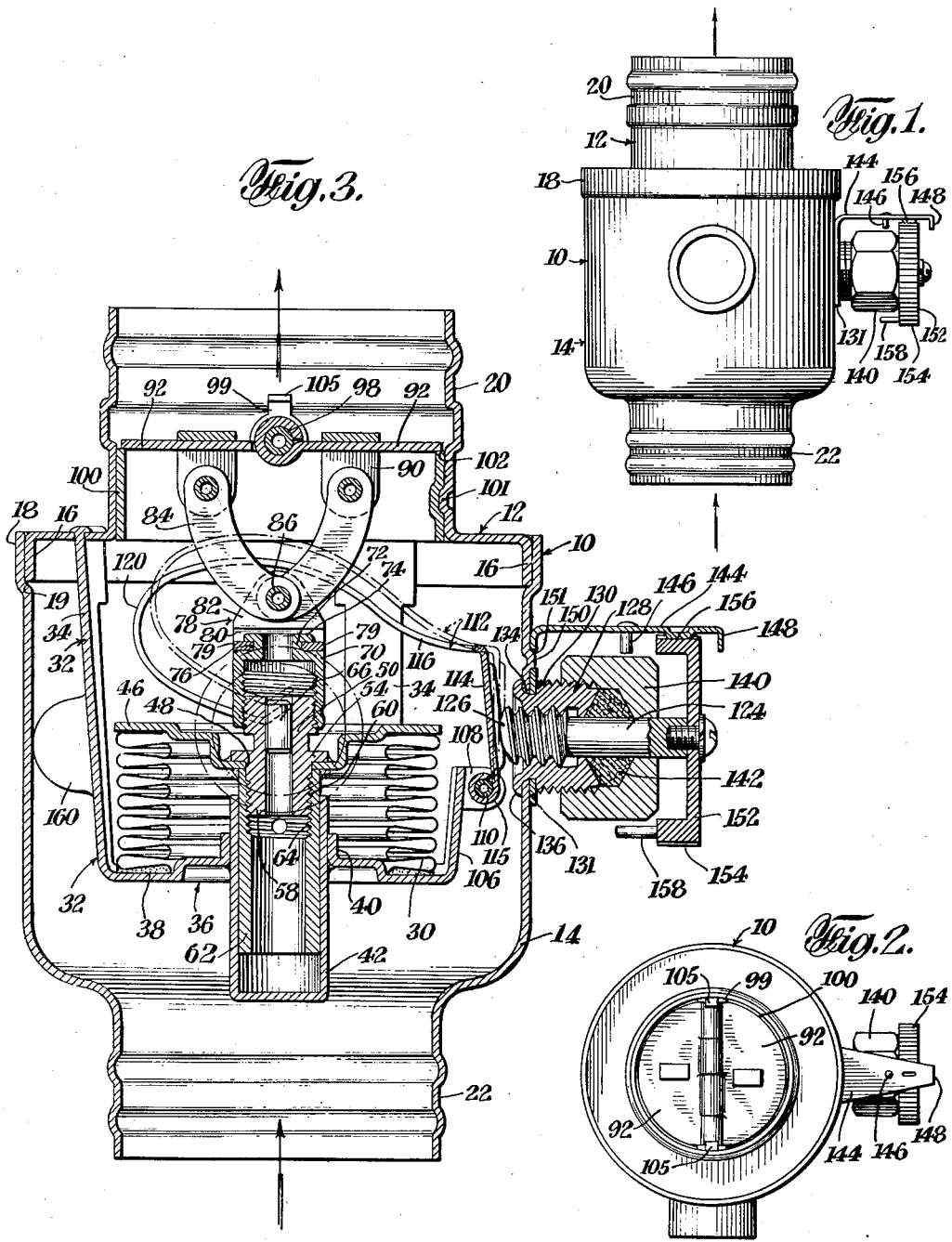

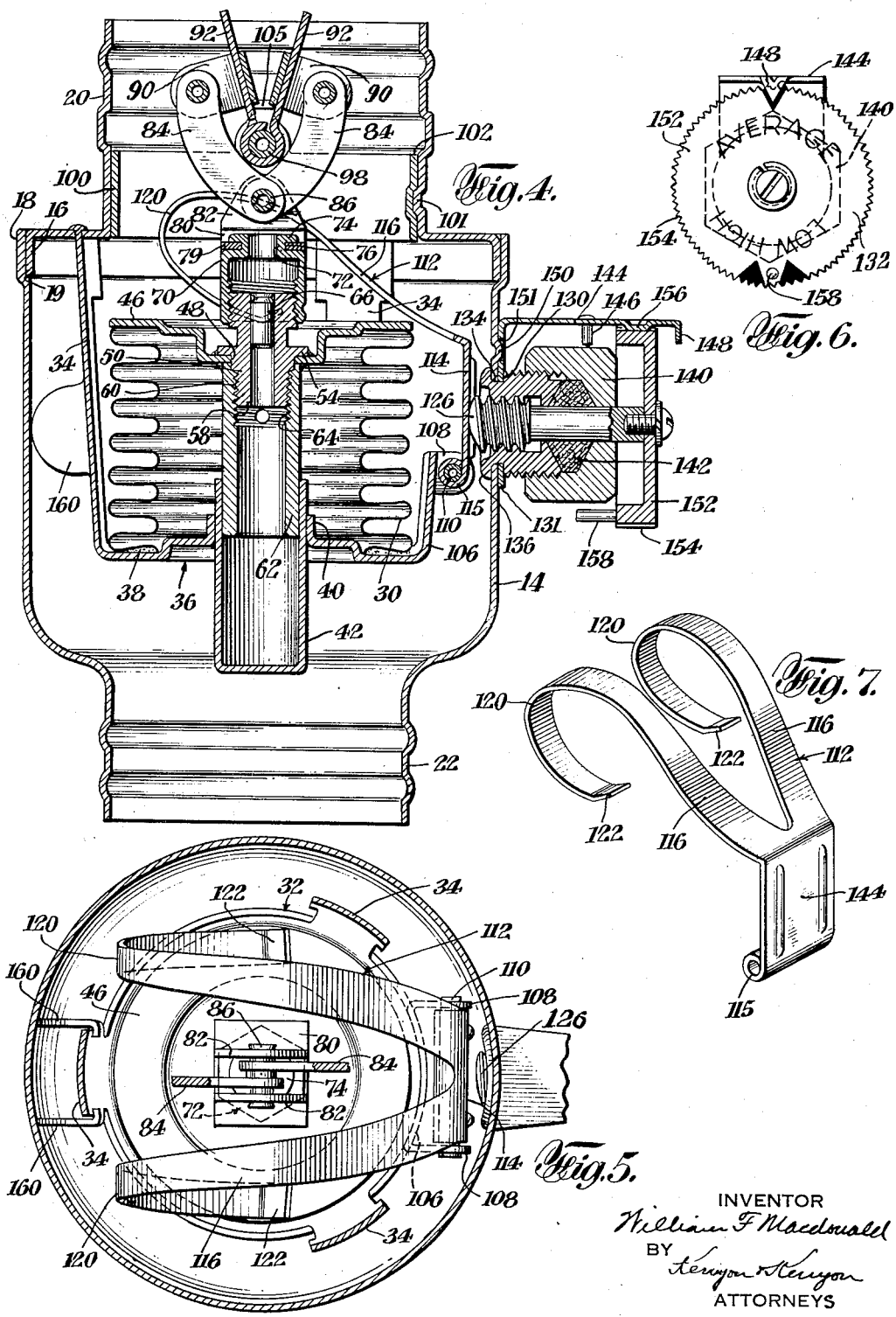

2,168,999

UNITED STATES PATENT OFFICE 2,168,999

THERMOSTATIC CONSTRUCTION

William F. Macdonald, Bridgeport, Conn., assignor to Bridgeport Thermostat Company, Inc., Bridgeport, Conn., a corporation of Delaware Application June 8, 1937, Serial No. 147,008

10 Claims. (Cl. 236—34)

This invention relates to thermostatic valve constructions.

The thermostatic valve construction as shown in the drawings is especially adapted for use in water cooling systems of internal combustion engines but may be used in other places where it is desirable to control the flow of circulating water or other liquid. It is well known that in the winter time and when the weather is cold it is more difficult to start the engine in an automobile and after started it takes more time to warm up the engine than in warm weather. Most damage to the engine when cold is due to insufficient lubrication, and occurs when the engine is started. It has been heretofore known to use thermostatic valve constructions but many difficulties have been encountered and also it has been found desirable to have a valve construction which may be adjusted so as to meet different weather conditions. For instance, in the winter time it is desired to have the valve on the thermostats closed for a longer period so as to warm up the body of liquid around the engine before passing it to the radiator of the automobile whereas in the summer time it is not necessary to so heat the water or cooling liquid around the engine. To provide for this adjustment I have shown a spring member which is regulated by an adjusting screw. The ends of the spring lie on top of the bellows and are not mechanically attached to the top of the bellows. When the adjusting screw is turned in or screwed inwardly in the thermostat housing it presses against a part of the spring member, and the ends of the spring are held against the top of the bellows and the bellows must compress the spring and create more pressure before the valve connected to the bellows or heat responsive element is opened. For summer driving the adjusting screw is turned counter-clockwise so as to relieve any pressure on the spring member and this in turn relieves the pressure on the top of the bellows allowing the bellows to open at a lower temperature and at a lower expansion pressure. This adjusting screw when adjusted for summer driving is so positioned that the spring member can be lifted by or travel upward with the bellows or thermostatic element for a short distance and so open the valve attached to the bellows or thermostatic element. In this way no restriction or additional load is placed on the top of the bellows outside of the bare weight of the spring member so that if the bellows becomes damaged or punctured, the bellows being initially under subatmospheric pressure will expand and the valve connected to the bellows will open and permit circulation of cooling liquid.

While I have shown one form of my device it is to be expressly understood that various changes may be made within the scope of my invention and the appended claims without digressing from the spirit of my invention.

In the drawings:

Fig. 1 represents a front elevation of a thermostatic valve construction made according to my invention;

Fig. 2 represents a top plan view of the device shown in Fig. 1;

Fig. 3 represents an enlarged vertical longitudinal cross section of my thermostatic valve construction showing the valve parts in closed position;

Fig. 4 represents an enlarged vertical longitudinal cross section showing the valve parts in open position and showing the spring member in partially compressed position;

Fig. 5 represents an enlarged horizontal transverse section;

Fig. 6 represents a view in elevation of the indicating member for the adjusting screw; and Fig. 7 represents a perspective view of the spring member.

Referring now to the drawings, the reference character 10 designates a casing or housing formed of the two parts 12 and 14. The upper housing part 12 has an annular flange 16 which fits into the enlarged spun portion 18 on the lower housing member 14 and rests on the shoulder 19 formed by such spinning. These parts are soldered or otherwise secured together at their juncture. The upper part 12 has the reduced portion 20, and the lower housing member 14 has a reduced portion 22 whereby the housing member may be inserted into a hose line or the like.

The thermostatic element or bellows member 30 is supported on the upper housing part or member 12 by means of the hanger or supporting member 32. As shown in Fig. 5 the hanger 32 preferably comprises three legs or arms 34 which are riveted or otherwise fastened at their upper ends to the upper housing member 12. The hanger or supporting member 32 has a disc-like base 36 preferably provided with a depressed annular portion forming a channel or groove 38 for receiving the lower end of the bellows member. This end of the bellows member may be soldered or otherwise suitably secured in place in channel 38. The base member 36 is also formed with a central upstanding ring or collar 40 to which a guide tube 42 is secured. This tube 42 has its upper end open and is closed at its bottom end and extends below the base member 36. The upper end of the bellows 30 is soldered or otherwise secured to a top member 46. This top member is of disc shape and is preferably of a stepped annular formation having a central opening 48. A nipple 50 is fitted into said opening 48. The nipple 50 has an annular flange 54 which rests on the top member 46 and has a reduced lower portion 58 received in the opening 48 in the top member. The nipple 50 and top member 46 are secured together by soldering the flange and the top member to one another. Other suitable securing means may be used. The lower end of the nipple 50 is screw threaded as at 60 to receive a guiding cylinder 62 internally threaded at its upper end 64. The cylinder 62 is screwed onto the lower end 58 of the nipple 50 to hold the flange 54 against top member 46. The guiding cylinder 62 is of such a size as to slidably fit in the guide tube 42 secured to the lower annular member 36. The bellows 30 is sealed under subatmospheric pressure by forcing the pin 66 into nipple 50.

The upper end of nipple 50 is threaded into nut 70 provided at its upper end with a reduced sleeve portion 72 and a spun edge 74 to form a channel 76 for loosely receiving yoke member 78. Yoke member 78 is formed with a bottom member 79, bent portions 80 and upstanding spaced ears 82 to which levers 84 are pivotally or hingedly connected by means of a pin 86. The upper ends of levers 84 are pivotally connected to members 90 rigidly attached to valve parts 92. The threaded connection between the nipple 50 and the nut 70 provides a construction whereby the position of the valve parts 92 may be changed with respect to the bellows. After final position is obtained the nut 70 is punched or staked so as to hold the parts in final adjusted position. The valve parts 92 are pivotally mounted or hinged on pin or hinge 98. The pin 98 is mounted in upstanding ears 99 of a collar or sleeve 100 which is fitted into housing part 12 and which is held in position by the punched or staked portion 101. The valve parts 92 cooperate with a valve seat 102 formed by the upper edge of collar or sleeve 100. The upstanding ears 99 each have an inwardly extending finger or lug 105 to limit the opening movement of the valve parts 92.

An upwardly extending flange or supporting member 106 is formed on the base member 36 between two of the arms 34, preferably by bending a part thereof upwardly. This supporting member 106 is provided with a pair of spaced and outwardly bent lugs or ears 108 which are provided with openings to receive a pin 110. A spring member 112 is pivotally mounted on the pin 110 and is provided with a flat reinforced back or upwardly extending portion 114, and has a pin receiving sleeve 115 at its lower end for pin 110. A pair of spring members or arms 116 extend and diverge from the back portion 114 and are bent over into arcuate form at their ends 120, which are spaced apart, see Fig. 7. The extreme inturned ends 122 of the spring members 116 are curved up sufficiently so that the ends of the spring members do not project or point downwardly and so that there is no chance of their being caught or held during the operation of the device. The end portions of the spring members 116 rest on the upper surface of top member 46 of the bellows device near the outer edge but are not secured or fastened thereto.

Means are provided whereby the pressure of the spring member 116 on the top member 46 of bellows 30 may be varied after the device is installed in operating position. This means takes the form of a screw member 124 located in the lower housing part 14 with its inner end 126 adjacent the flat back portion 114 of the spring member 112.

The screw 124 is threaded into a nipple member 128 which is provided with a shoulder portion 130 to receive and hold apertured member 131 of indicating member 132 later to be described. The nipple member 128 is inserted in opening 134 in housing part 14 and the end spun over as at 136 to connect the nipple member 128 to the housing 14. A nut 140 is threadedly mounted on the nipple member 128 with packing 142 therebetween. The indicating member 132 is provided with a flange portion 144 having a stop pin 146 depending from an intermediate portion and an indicator 148 provided at its outer end. The pin may be struck out from flange 144. The apertured member 131 of indicating member 132 is held from rotation on the lower housing part 14 by means of the punched portion 150 engaging in opening 151. A flanged disc 152 is secured to the outer end of screw member 124 and is provided with a knurled edge 154 which is adapted to cooperate with and be frictionally engaged by the depressed portion or detent 156 of the flange 144. The disc 152 is provided with an inwardly extending stop pin 158 which is adapted to cooperate with the stop pin 146 on the flange member 144 so as to limit the relative movement of the parts. The disc 152 is provided with the indications "high" "low" and "average" to indicate the various positions of the screw member, and to indicate the adjustment.

When the screw member 124 is screwed in so as to press against back portion 114, the spring 112 exerts pressure on top of the bellows member 30. Then, when the bellows member expands it will tend to move the hanger 32 to one side and in this way prevent proper functioning of the parts. In order to overcome this difficulty the arm of the hanger which is directly opposite to the screw member 124 is provided with outwardly bent ears 160 which abut and engage the inner wall of the lower housing part 14 and hold the parts in rigid position so as to insure perfect functioning of the device.

The operation of the device will now be described. With the disc 152 in such position as to register "low" the screw member 124 is furthest away from the back portion 114 of the spring 112 and the device may function as if the spring were not present. The spring does not exert any effective pressure on top of the bellows. From the construction it is apparent that when the circulating liquid is cold the bellows 30 will be collapsed and the valve parts 92 will be held in closed position. As the circulating liquid becomes heated due to the operation of the engine, the liquid will become hotter and as it becomes hotter the surrounding parts and also the bellows member 30 will become heated. When the liquid has become heated so as to insure proper functioning of the engine the bellows member 30 will expand to open the valve parts 92 and permit circulation of the liquid through the radiator of the automobile. In winter driving when it is desired to have the engine properly heated up before the liquid is permitted to pass to the radiator the disc 152 is rotated so that the indication reads "high". In this position the screw is moved inwardly until it moves the back portion 114 of the spring 112 inwardly compressing the spring against the top of the bellows element so that any expanding movement of the bellows member is against the spring pressure of the spring member 112. In this "high" position the spring 112 actually exerts an effective pressure on the top of the bellows. In this way it will be apparent that the liquid will have to be at a higher temperature before the bellows member 30 is sufficiently hot to expand and overcome the spring pressure of the spring 112 to open the valve parts 92. In opening the valve parts the expansion movement of the bellows member will further compress the arms of the spring 112.

As shown in Fig. 5 of the drawings, the disc member 152 is shown in intermediate or average position and the inner end 126 of the screw member 124 is positioned a slight distance from the back portion 114 of the spring 112. As shown in Fig. 3, the inner end of the screw member 124 is spaced from the flat member 114 of the spring 112 so that the bellows member 30 may expand and move the spring upwardly to the position shown in dotted lines before the spring exerts any pressure on the top of the bellows. After this position is reached, further expansion of the bellows works against the spring member as shown in Fig. 4.

While the construction illustrated and described is primarily designed for use between the sections of the hose lines, the parts including the housing may be readily and equally well designed for mounting and positioning in other parts of the water circulating system as, for example, in the engine head or in the radiator inlet, or elsewhere. The specific form of valve construction illustrated and described comprises a pair of pivotally mounted parts, but it is to be expressly understood that the specific form of valve may be changed and other forms of valves used with the operating and control parts which are disclosed and claimed. Standard types of such valves now in use include the butterfly valve or a poppet head type of valve.

While in a device constructed in accordance with the specific disclosure in this application, the valve will open automatically if the bellows become punctured or damaged, when the parts are adjusted at the "low" or lower range of adjustment, it is of course understood that in other positions of adjustment the spring pressure on the top of the bellows might be sufficient to prevent the valve from opening under such conditions.

From the foregoing it will be apparent that I have described a relatively simple device which may be applied to engines or the like and the operation of the device may be changed to meet different conditions which are encountered in the operation of the engine.

What I claim is:

1. A thermostatic valve construction including a housing adapted to be inserted in a liquid conduit, a hanger suspended from said housing, a bellows member on said hanger, means on said hanger for guiding the movement of said bellows member, a valve member and a valve seat, means connecting said bellows member and said valve member so that when said bellows member expands the valve part will be moved away from said valve seat, and means associated with said bellows member whereby the pressure to be overcome by said bellows member may be increased, said means including a spring member comprising a back portion pivotally supported from said hanger, and curved divergent arms extending from said back portion, said arms resting unattached on top of said bellows member with the free ends of said arms bent away from said bellows member.

2. A device of the character described, including, in combination, a housing, a bellows member supported on said housing, a valve seat, a valve member operably connected to said bellows member and cooperating with said valve seat, a spring member having a back portion pivotally supported in said housing and having divergent curved arms extending from said back portion, said arms resting on said bellows member, and a screw member rotatably mounted in said housing and adapted in one position to bear against said back portion of said spring member to cause the bellows member to work against a greater pressure in moving said valve part away from said valve seat.

3. A device of the character described, including, in combination, a housing, a bellows member in said housing, a hanger in said housing for supporting said bellows member, a valve mechanism operated by said bellows member, spring means pivoted at one side of said bellows member for changing the load on said bellows member, said spring means comprising a back member having curved divergent arms extending therefrom, said arms resting unattached on top of said bellows member, and means opposite from said spring means for rigidly holding said hanger in position to prevent distortion or disalinement of the operating parts.

4. A device of the character described, including, in combination, a housing, a bellows member in said housing, a support for said bellows member, and spring means associated with said bellows member for varying the pressure on said bellows member, said spring means being pivotally mounted on said support and having arms extending over and resting on the top of said bellows member, said arms being bent into curved shape and having their ends bent upwardly away from said bellows member.

5. A device of the character described, including, in combination, a housing, a bellows member in said housing, a support for said bellows member, and spring means associated with said bellows member for varying the pressure on said bellows member, said spring means including a back portion pivotally mounted on said support, said back portion having divergent spring arms extending therefrom, said arms being bent into curved shape and having their ends bent upwardly away from said bellows member.

6. A device of the character described, including, in combination, a housing, a bellows member in said housing, a support for said bellows member, and spring means associated with said bellows member for varying the pressure on said bellows member, said spring means including a back portion pivotally mounted on said support, said back portion having divergent spring arms extending therefrom, said arms being bent into curved shape and contacting the top of said bellows member at points substantially diametrically opposite.

7. A device of the character described, including, in combination, a housing, a bellows member in said housing, a support for said bellows member, spring means associated with said bellows member for varying the pressure on said bellows member, said spring means including a back portion pivotally mounted on said support, said back portion having divergent curved spring arms extending therefrom, said curved arms resting unattached on the top of said bellows member, and an adjusting screw mounted on said housing and associated with said spring means for changing the load on said bellows member.

8. A device of the character described, including, in combination, a housing, a bellows member in said housing, a support for said bellows member, spring means associated with said bellows member for varying the pressure on said bellows member, said spring means including a back portion pivotally mounted on said support, said back portion having divergent curved spring arms extending therefrom, said arms resting unattached on the top of said bellows member and having their ends bent upwardly away from said bellows member, and an adjusting screw mounted on said housing and associated with said spring means for changing the load on said bellows member, by varying the pressure of said spring arms on the top of said bellows member, said adjusting screw being adapted to cooperate with said back portion of said spring means to cause the action of said spring arms to be varied by adjustment of said adjusting screw.

9. A device of the character described, including, in combination, a housing, a bellows member in said housing, a support for said bellows member, spring means associated with said bellows member for varying the pressure on said bellows member, said spring means including a back portion pivotally mounted on said support, said back portion having divergent curved spring arms extending therefrom, said arms resting unattached on the top of said bellows member, and an adjusting screw mounted on said housing and adjacent said back portion of said spring means whereby adjustment of said adjusting screw to one position causes said screw to abut said back portion and cause said spring arms to exert pressure on said bellows member.

10. A device of the character described, including, in combination, a housing, a bellows member in said housing, a support for said bellows member, a spring pivotally mounted on said support and having a back portion and divergent curved arms extending over and resting unattached on top of said bellows member and having their free ends bent upwardly away from said bellows member, and means for changing the effectiveness of said spring.

WILLIAM F. MACDONALD.